United States Patent [19]

Norrie

[11] Patent Number: 4,979,269
[45] Date of Patent: Dec. 25, 1990

[54] METHOD AND APPARATUS FOR SEPARATING BACK FAT FROM LOINS

[76] Inventor: Lyle W. Norrie, 24 Stoneglen Dr., Etobicoke, Ontario, Canada, M9C 2V5

[21] Appl. No.: 388,946

[22] Filed: Aug. 3, 1989

[51] Int. Cl.⁵ ............................................. A22C 25/18
[52] U.S. Cl. .................................. 452/134; 452/150; 452/171
[58] Field of Search .............. 17/45, 52, 50, 21, 1 G, 17/1 R, 23

[56] References Cited

U.S. PATENT DOCUMENTS

| | | | |
|---|---|---|---|
| 3,975,796 | 8/1976 | Labarbeh | 17/45 |
| 4,189,806 | 2/1980 | Van Heyningen | 17/52 |
| 4,209,878 | 7/1980 | Aubert | 17/52 |
| 4,557,019 | 12/1985 | Van Deuanter et al. | 17/52 |
| 4,562,614 | 1/1986 | Gerding | 17/23 |

Primary Examiner—Willis Little

[57] ABSTRACT

Apparatus for the separation of back fat from a loin portion of a carcass and having a conveyor for supporting and moving a loin portion with the back fat lowermost, a pressure device for applying pressure to the upper surface of a loin portion, a generally arcuate blade interposed between the conveyor and the pressure device, the blade being moveable relative to the conveyor, a device for sensing the thickness of back fat on the loin portion between the conveyor and the lean portion of the loin, and generating measurement signals, and thereby moving the blade, and a method of separating back fat from loins by the use of such apparatus.

10 Claims, 3 Drawing Sheets

METHOD AND APPARATUS FOR SEPARATING BACK FAT FROM LOINS

FIELD OF THE INVENTION

The invention relates to a method and apparatus of dressing portions of meat carcasses and, in particular, to a method and apparatus of trimming back fat from loins.

BACKGROUND OF THE INVENTION

In the dressing of animal carcasses, typically of pork, but also of other animals, the carcass is separated down the back bone into two halves. The loin portion of the carcass which is usually one of the more desirable portions of the carcass then consists of a portion of back bone, and ribs, and meat, and an outer layer of fat. It is the practice when dressing carcasses to separate the so-called "back fat" from the loin meat or lean portion. In the past, this was usually done by hand. In U.S. Pat. No. 4,189,806, there is described a machine for mechanical separation of back fat from the loin. In this machine, the loin is supported on a conveyor with an arcuate cross-section, and is subjected to pressure from overhead pressure means. A curved knife blade is placed in the path of the loin, between the lower conveyor and the upper pressure means. The loin is thus forced against the blade, and the back fat is separated or trimmed away from the meat, by the curved knife blade.

This machine was a considerable improvement upon machines which had been proposed earlier, for the same purpose. However, there were certain shortcomings. Obviously, carcasses of different weights, strains and sub-species will have more or less back fat and meat. The location of the knife blade must then be capable of being adjustable, to provide the optimum degree of trimming. However, in order to speed up processing time, it is desirable to process loins through the machine on a more or less continuous basis. It is, therefore, sometimes attempted to effect a manual adjustment of the position of the blade for each portion of the loin but this can be erratic. In the machine, as described in the aforesaid patent, it was, in practice usually necessary to adjust the blade to an average position, and accept some degree either of wastage of meat, or of excess fat being left on the meat.

In addition, the passing of a knife blade through a layer of fat, inevitably results in a deposit of fat on the knife blade which gradually builds up. As the fat deposit builds up, the knife blade presents more and more frictional resistance to passage of the loin. As a result, the motive power required to force the loin past the knife blade increases, to the point where it eventually becomes necessary to stop the machine and clean the knife blade. Again, this interrupts processing and slows down the entire line.

BRIEF SUMMARY OF THE INVENTION

With a view to overcoming the various problems, the invention comprises an apparatus for the separation of back fat from a loin portion of a carcass, said loin portion including back fat and lean portions, and comprising conveyor means for supporting a loin portion of a carcass and continuously moving the same along a predetermined path with said fat portion lowermost, pressure means for continuously applying pressure to the upper surface of a loin portion moving on a portion of said conveyor means, generally arcuate blade means interposed between said conveyor means and said pressure means, mounting means for said blade means whereby said blade means is moveable relative to said conveyor means, means for sensing the thickness of said back fat between said conveyor means and said lean portion of a said continuously moving loin portion, and operable to generate a fat thickness signal, and, means response to said fat thickness signal, to move said blade means to optimise separation of said back fat from said lean portion.

More particularly, it is an objective of the invention to provide an apparatus having the foregoing advantages including means for sensing the speed of said conveyor means.

More particularly, it is an objective of the invention to provide an apparatus having the foregoing advantages and including means for washing said knife blade.

More particularly, it is an objective of the invention to provide an apparatus having the foregoing advantages and including means for sensing the movement of a said loin portion along said conveyor, and generating a movement signal, and control means responsive to a said movement signal to operate said washing means, whereby said washing means is operated after the passage of a said loin portion past said blade means, and prior to the passage of the next said loin portion.

The invention further comprises a method of separating back fat from loin portions of carcasses, by the operation of the apparatus as aforesaid.

The various features of novelty which characterize the invention are pointed out with more particularly in the claims annexed to and forming a part of this disclosure. For a better understanding of the invention, its operating advantages and specific objects attained by its use, reference should be had to be accompanying drawings and descriptive matter in which there are illustrated and described preferred embodiments of the invention.

IN THE DRAWINGS

DESCRIPTION OF A SPECIFIC EMBODIMENT

Figure 1:
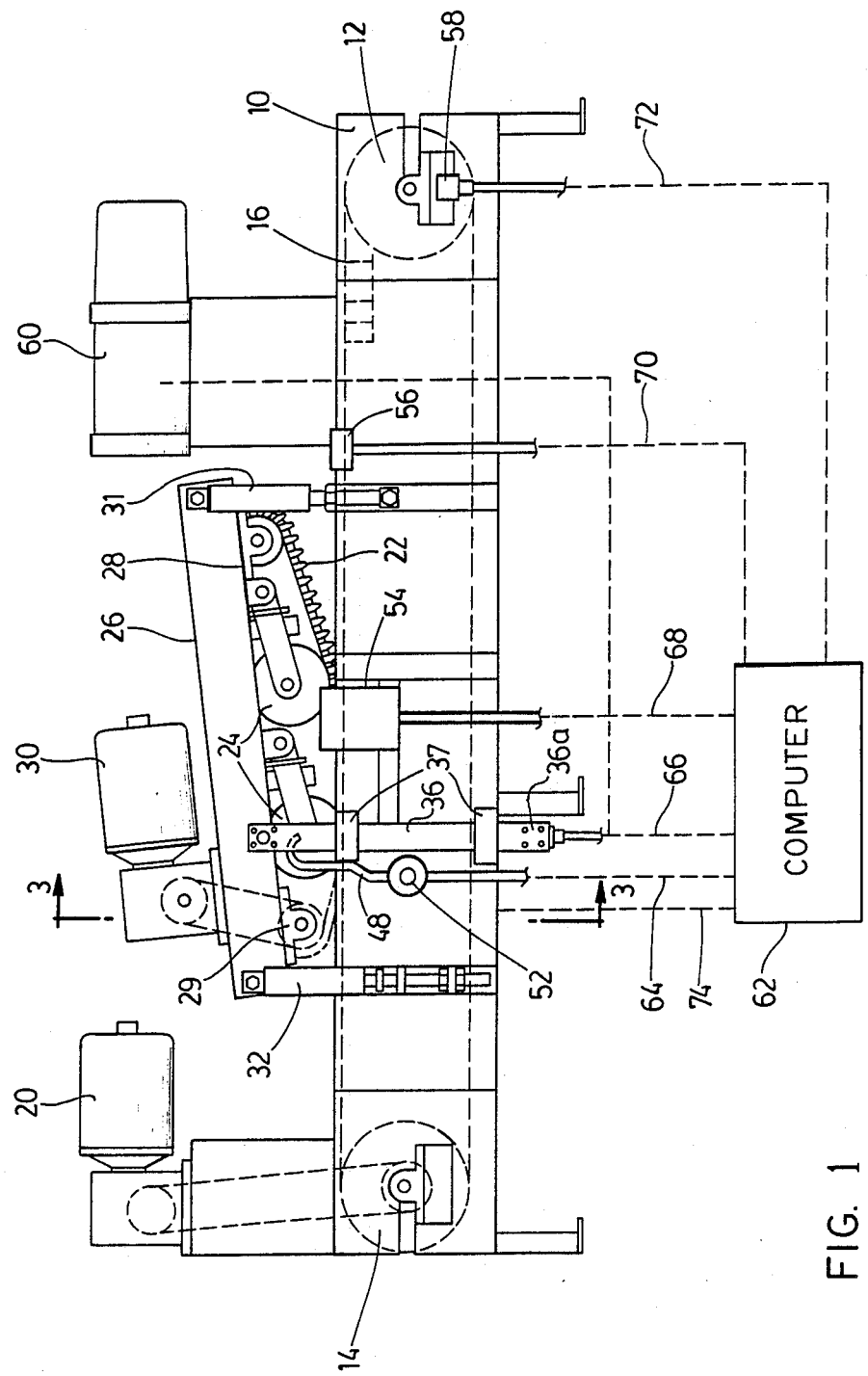
FIG. 1 is a partially schematic side elevational view of the apparatus in accordance with the invention.
Figure 2:
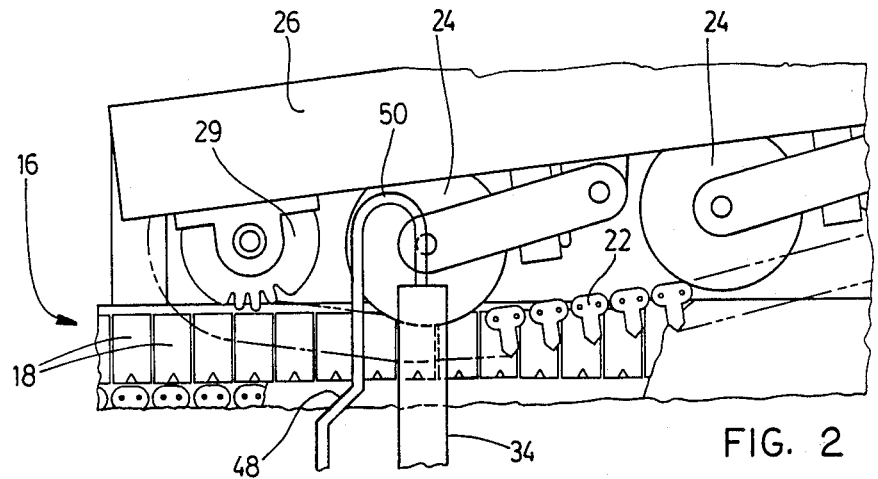
FIG. 2 is a greatly enlarged side elevation partially in section of the blade portion of the apparatus of FIG. 1.
Figure 3:
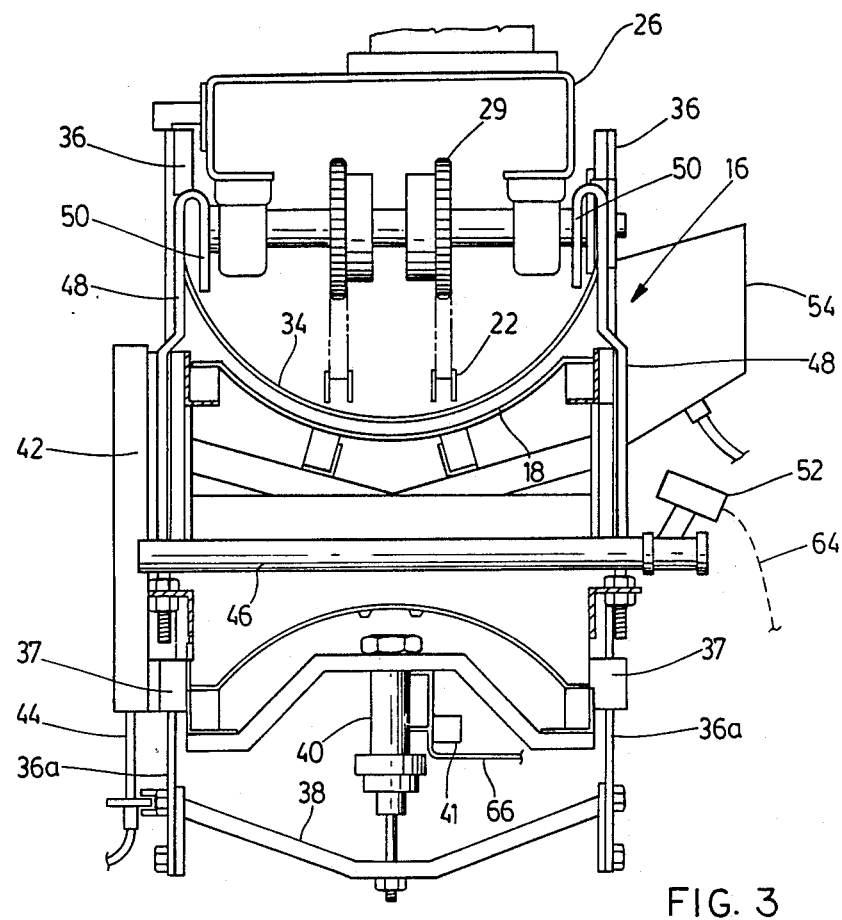
FIG. 3 is a section along the line 3—3 of FIG. 1.

Referring first of all to FIG. 1, the apparatus in this embodiment of the invention will be seen to be of a generally similar construction to that described in the aforesaid U.S. Letters Patent, and much of the detail of the apparatus will, therefore, be omitted for the sake of clarity. The apparatus in this embodiment will thus be seen to consist generally of a frame indicated as 10, having leading and trailing end rolls 12 and 14 supporting a conveyor 16. As best shown in FIG. 3, the conveyor consists of a plurality of closely spaced conveyor band portions 18 of generally semi-circular arcuate shape. Conveyor 16 is driven by motor 20, and moves from the leading end roller 12 to the trailing end roller 14, i.e., from right to left as shown in FIG. 1.

The arcuate shape of the bands 18 is designed so as to support a loin portion of a carcass in the optimum position for treatment in the manner described below.

In order to apply to the loin portions and keep them firmly engaged on the conveyor 16, pressure means in the form of a plurality of (in this case two) two pressure belts or bands 22 are provided, running around rolls 24 which are, in turn, supported on a moveable pressure framework 26. The bands 22 run around end rolls 28 and 29, and are driven by means of motor 30.

The entire pressure framework 26 is mounted so as to be moveable against resilient pressure means indicated as leading and trailing end cylinders 31 and 32. Cylinders 31 and 32 may be pneumatic struts, or any suitable form of spring means. In this way, as the loin passes between the leading end of the bands 22, it will displace the frame 26, and, in turn, the bands 22 will be applying pressure to the loin to hold it securely in position on the conveyor 16.

Both the conveyor 16, and the bands 22, are preferably provided with some form of frictional engagement means or teeth (not shown) such as those shown in U.S. Pat. No. 4,189,806, or other frictional formations for engaging the surfaces of the loin portion to provide firm positive engagement.

In order to separate the back fat from the loin meat, an arcuate generally semi-conductor knife blade 34 is positioned between conveyor 16, and bands 22. Knife blade 34 is supported at each end on upright slide bars 36. Slide bars 36 are mounted on the frame 10, on either side thereof in, for example, supports 37 whereby they may be moved upwardly and downwardly in a manner described below. the slide bars 36 have lower ends 36a which are connected to a transverse yoke 38. Yoke 38 is connected to a motive power source such as hydraulic piston and cylinder 40, controlled by blade solenoid 41. By the operation of the cylinder 40, the knife blade 34 can be raised and lowered.

In order to sense the position of the blade 34 at any given time, a blade encoder device 42 is provided, having a moveable rod 44 extending therefrom and being connected to yoke 38.

In order to clean the blade 34 and prevent buildup of fat, hot wash water is supplied to main conduit 46, and then to two upwardly extending branch conduits 48—48. Branch conduits 48 are formed with bend portions 50—50 at their upper ends. The bend portions 50—50 are located at the two upper ends of the blade 34. Wash water ejected from the bend portions 50 will thus flow downwardly over blade 34 from either end of the blade towards its centre. The wash water is at an elevated temperature, and effectively cleans the knife blade 34 of accumulated fat. The wash water does not run continuously, but is operated intermittenly, being controlled by a solenoid operated valve 52.

In order to position the blade 34 as accurately as possible, a video camera and light source indicated generally as 54 is provided alongside conveyor 16, more or less adjacent or slightly downstream of the position of the first of the two pressure rolls 24. The camera functions to observe and sense the thickness of the portion of fat the loin lying lowermost on the conveyor as it approaches the knife blade. The knife blade is then adjusted automatically in a manner described below.

In order to sense the spacing between loins on the conveyor, a fibre optic sensor 56 is provided, again, alongside conveyor 16, but closer to the upstream end.

In order to sense the speed of the conveyor 16, a conveyor encoder 58 is provided, connected to roll 12.

In order to provide hydraulic power for cylinder 40, an hydraulic pump and motor indicated generally as 60, are provided, being coupled in a manner known per se to cylinder 40. Cylinder 40 is controlled by blade cylinder solenoid valve 41, in a manner to be described below.

Referring now to FIG. 1, it will be observed that a computer 62 is coupled by connection 64, to solenoid 52 and by connection 66 to blade solenoid 41, and by connection 68 to camera 54, and by connection 70 to fibre optic sensor 56, and by connection 72 to conveyor encoder 58, and by connection 74 to blade encoder 42.

Figure 4:
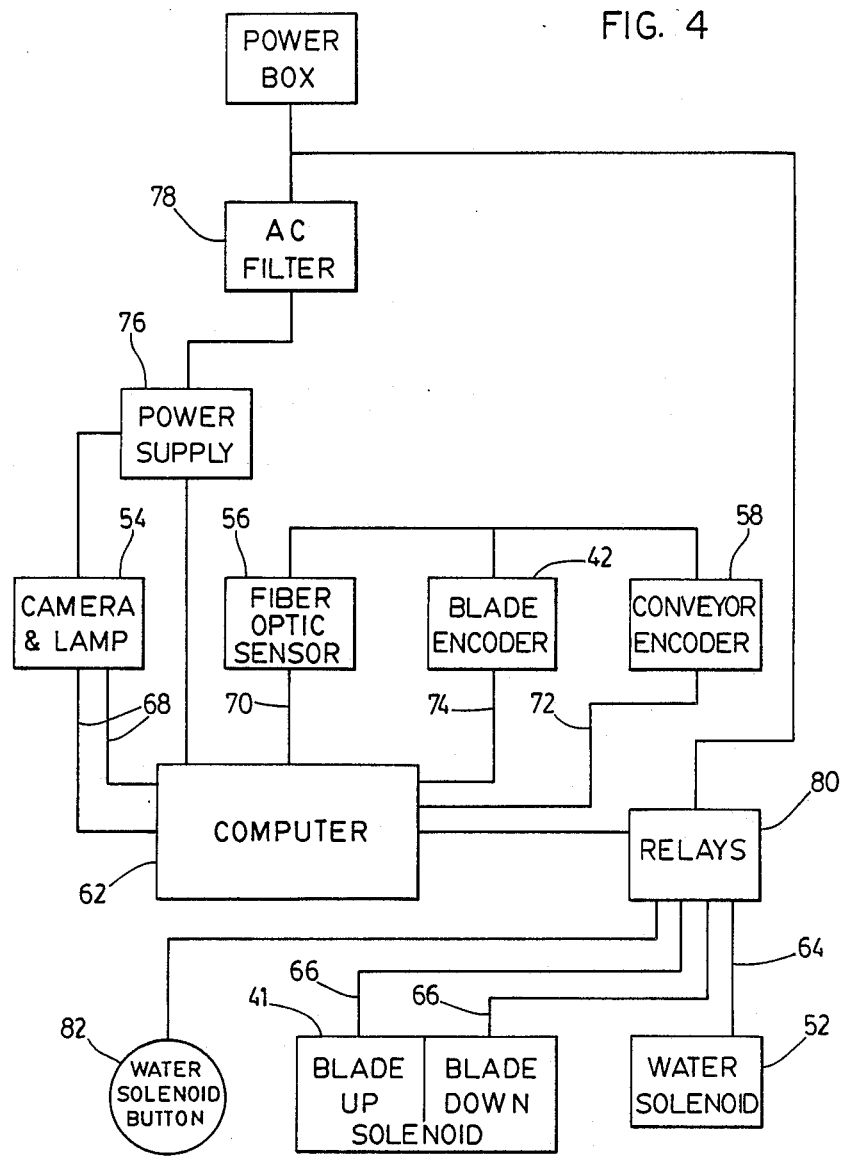
FIG. 4 is a schematic block diagram of the apparatus and its control means.

Referring now to FIG. 4, the layout of the controls is shown in block diagram form.

As will be seen, the control system further incorporates a power supply 76 with filter 78, in a manner known per se and requiring no description, and also with relays 80 and for solenoid 52 and also with a water solenoid button 82, which may be used to override the automatic operation of the water solenoid 52.

In operation, loins are placed, with the outer or fat side lowermost downwardly on conveyor 16, at predetermined timed intervals. As a loin moves along conveyor 16, the position of it on the conveyor will be detected by fibre optic sensor 56, and the speed of the conveyor will be sensed by encoder 58.

As it is drawn into the pressure bands 22, it will force the frame 26 against the struts 31 and 32 and, in turn, the bands 22 will thus be pressed firmly against the exposed upper surface, i.e., the lean portion of the loin. At this time, the camera 54 will observe the thickness of fat on the underside of the loin lying on the conveyor. It will then send appropriate fat signals to the computer. The computer, in turn, will either signal the blade solenoid 41 that no adjustment is necessary, or alternatively will signal the blade solenoid 41 so as to adjust the position of the blade 34 by operating the cylinder 40. As the loin is forced past the blade 34, the blade 34 will separate the lower fat portion from the upper lean portion, and the two separated portions will then be delivered to the downstream end 14 of the conveyor. Depending upon the intervals between the loins on the conveyor, the computer will then signal the water solenoid 52 to supply hot wash water up the branch conduits 48 to the bend portions 50. Hot wash water will then stream down over the blade 34, cleaning from it any accumulated fat. The computer will then signal the solenoid 52 to terminate water supply, and the next loin will then be engaged by the bands 22 and processed in the same way. In the event that the fat portion of the next loin is thicker, then the camera 54 will sense this and the computer will then signal the blade solenoid 41, to cause movement of blade 34 upwardly away from conveyor 16. In the event that the fat portion detected by the camera is thinner, then the blade 34 will be moved closer to the conveyor 16.

In this way, it is possible to process large batches of loins on an essentially continuous basis with only relatively small time intervals between them. In the operation of the previous machine, an operator attempted to make manual adjustments to the blade height, at intervals between the loins, based on his own visual observation of each loin, and thus limited production. At the same time, accumulations of fat on blade 34 are effectively substantially limited or eliminated, by the intermittent supply of hot washing water to the blade 34, between the passage of each loin or group of loins.

The foregoing is a description of a preferred embodiment of the invention which is given here by way of example only. The invention is not be taken as limited to any of the specific features as described, but comprehends all such variations thereof as come within the scope of the appended claims.

What is claimed is:

1. Apparatus for the separation of back fat from a loin portion of a carcass said loin portion including back fat and lean portions and comprising:

conveyor means for supporting a loin portion of a carcass and continuously moving the same along a predetermined path with said fat portion lowermost;

pressure means for continuously applying pressure to the upper surface of a loin portion moving on a portion of said conveyor means;

generally arcuate blade means interposed between said conveyor means and said pressure means;

mounting means for said blade means whereby said blade means is moveable relative to said conveyor means;

means for sensing the thickness of said back fat between said conveyor means and said lean portion of a said continuously moving loin portion, and operable to generate a fat thickness signal, and, means responsive to said fat thickness signal, to move said blade means to optimise separation of said back fat from said lean portion.

2. Apparatus as claimed in claim 1 including means for sensing the speed of said conveyor means.

3. Apparatus as claimed in claim 1 including means for washing said blade means.

4. Apparatus as claimed in claim 3 and including means for sensing the movement of a said loin portion along said conveyor and operable to generate a movement signal, and control means responsive to a said movement signal to operate said washing means, whereby said washing means is operated after the passage of a said loin portion past said blade means, and prior to the next said loin portion reaching said blade means.

5. Apparatus as claimed in claim 3 wherein said washing means includes two water supply conduits, adapted to supply water to opposite ends of said blade means and valve means for controlling flow of water therethrough.

6. Apparatus as claimed in claim 1 including blade encoder means for sensing the location of said blade means, and power operated blade movement means for moving said blade means.

7. Apparatus as claimed in claim 6 including video camera means for sensing the thickness of said back fat between said conveyor means and said lean portion of a said loin portion and generating said fat thickness signals, and signal processing means for controlling said blade movement means in response to said signals.

8. A method of separating back fat from a loin portion of a carass said loin portion including back fat and lean portions and comprising the steps of:

continuously conveying a said loin portion on conveyor means along a conveyor path with said fat portion lowermost, towards a generally arcuate blade means;

sensing the thickness of said back fat between said conveying means and said lean portion of said loin portion, and generating a fat thickness signal;

processing said fat thickness signal in signal processing means, and generating a blade movement signal;

passing said blade movement signal to blade movement means, for moving the position of said blade, whereby to optimize of separating said back fat from said lean portion of said loin portion;

subjecting said loin portion to pressure from pressure means, whereby to securely engage and to hold said loin portion on said conveyor means;

conveying said loin portion while subjecting same to pressure, past said blade means whereby to remove a layer of back fat from said loin portion, and, subsequently releasing said loin portion from said pressure means and moving same from said conveyor.

9. A method as claimed in claim 8 wherein a plurality of said loin portions are processed continuously one after the other at spaced intervals, and including the further step of washing said blade means, after the passage of one said loin portion past said blade means and prior to the next said loin portion reaching said blade means.

10. A method as claimed in claim 9 including the steps of sensing the movement of a loin portion along said conveyor, and generating a movement signal, passing said movement signal to said signal processing means, and generating a washing signal, and passing said washing signal to said washing means.

* * * * *